United States Patent
Hill (10) Patent No.: US 9,672,249 B2
(45) Date of Patent: Jun. 6, 2017

(54) COMPARING JOIN VALUES IN DATABASE SYSTEMS

(71) Applicant: Gerhard L. Hill, St. Leon-Rot. (DE)

(72) Inventor: Gerhard L. Hill, St. Leon-Rot. (DE)

(73) Assignee: SAP SE, Walldorf (DE)

( * ) Notice: Subject to any disclaimer, the term of this patent is extended or adjusted under 35 U.S.C. 154(b) by 353 days.

(21) Appl. No.: 14/572,069

(22) Filed: Dec. 16, 2014

(65) Prior Publication Data
US 2016/0171049 A1   Jun. 16, 2016

(51) Int. Cl.
*G06F 17/30* (2006.01)

(52) U.S. Cl.
CPC ............................. *G06F 17/30466* (2013.01)

(58) Field of Classification Search
CPC combination set(s) only.
See application file for complete search history.

(56) References Cited

U.S. PATENT DOCUMENTS

| | | | |
|---|---|---|---|
| 7,693,821 B2 | 4/2010 | Hill et al. | |
| 7,941,423 B2 | 5/2011 | Hill et al. | |
| 8,180,805 B2 | 5/2012 | Hill | |
| 8,271,478 B2 | 9/2012 | Hill et al. | |
| 8,296,289 B2 | 10/2012 | Hill | |
| 8,478,793 B2 | 7/2013 | Hill et al. | |
| 8,577,925 B2 | 11/2013 | Hill | |
| 8,788,482 B2 | 7/2014 | Hill | |
| 2010/0250517 A1* | 9/2010 | Bendel | G06F 17/30595 707/714 |

* cited by examiner

*Primary Examiner* — Etienne Leroux
(74) *Attorney, Agent, or Firm* — Fish & Richardson P.C.

(57) ABSTRACT

The present disclosure describes methods, systems, and computer program products for performing JOIN value comparisons. One computer-implemented method includes converting, by operation of a computer system, a first value of a first data type into a second value of a second data type, wherein the first value is a value of a first attribute of a first table; converting, by operation of a computer system, the second value of the second data type into a third value of a third data type; converting, by operation of a computer system, a fourth value of the third data type into a fifth value of the second data type, wherein the fourth value is a value of a second attribute of a second table; converting, by operation of a computer system, the fifth value of the second data type into a sixth value of the first data type; and performing JOIN operations of the first table and the second table in response to determining that the first value equals the sixth value, and the fourth value equals the third value.

21 Claims, 3 Drawing Sheets

COMPARING JOIN VALUES IN DATABASE SYSTEMS

BACKGROUND

A JOIN operation in a database system is a means for combining fields from two or more tables by using values common to each and can create a set that can be saved as a table or used as-is. For example, a JOIN operation in Structured Query Language (SQL) can match rows of one table with rows of another table, based on values in those rows. Determining whether it is possible to JOIN values of different types can be extremely inefficient and computationally expensive.

SUMMARY

The present disclosure relates to computer-implemented methods, computer-readable media, and computer systems for performing JOIN value comparisons. One computer-implemented method includes converting, by operation of a computer system, a first value of a first data type into a second value of a second data type, wherein the first value is a value of a first attribute of a first table; converting, by operation of a computer system, the second value of the second data type into a third value of a third data type; converting, by operation of a computer system, a fourth value of the third data type into a fifth value of the second data type, wherein the fourth value is a value of a second attribute of a second table; converting, by operation of a computer system, the fifth value of the second data type into a sixth value of the first data type; and performing JOIN operations of the first table and the second table in response to determining that the first value equals the sixth value, and the fourth value equals the third value.

Other implementations can include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, further comprising determining, by operation of the computer system, whether the second data type is able to be converted to the third data type; and wherein converting the second value of the second data type into the third value of a third data type includes converting the second value of the second data type into the third value of a third data type in response to determining that the second data type is able to be converted to the third data type.

A second aspect, combinable with any of the previous aspects, further comprising determining, by operation of the computer system, whether the second data type is able to be converted to the third data type; and refraining from performing JOIN operations of the first table and the second table in response to determining that the second data type is not able to be converted to the third data type.

A third aspect, combinable with any of the previous aspects, further comprising determining, by operation of the computer system, whether the second data type is able to be converted to the first data type; and wherein converting the fifth value of the second data type into the sixth value of the first data type comprises converting the fifth value of the second data type into the sixth value of the first data type in response to determining the second data type is able to be converted to the first data type.

A fourth aspect, combinable with any of the previous aspects, further comprising determining, by operation of the computer system, whether the second data type is able to be converted to the first data type; and refraining from performing JOIN operations of the first table and the second table in response to determining that the second data type is not able to be converted to the first data type.

A fifth aspect, combinable with any of the previous aspects, wherein the second data type comprises a string type.

A sixth aspect, combinable with any of the previous aspects, wherein each of the first data type and the third data type comprises a numeric type.

The subject matter described in this specification can be implemented in particular implementations so as to realize one or more of the following advantages. The example techniques can be applied to large, complex datasets that support a number of different data types. The example techniques can improve the efficiency, reduce the computational complexity, and ensure the condition of JOIN conditions to be satisfied before performing JOIN operations on tables. For example, the number of conversion functions needed can be reduced by an order of magnitude, from N to $2*\sqrt{N}$. In one use case with N=2500, the number of conversion functions needed reduces from 2500 down to 100. Besides, the symmetry apparent in a join condition like A.x=B.y is respected in evaluation. Other advantages will be apparent to those skilled in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

The following detailed description is presented to enable any person skilled in the art to make, use, and/or practice the disclosed subject matter, and is provided in the context of one or more particular implementations. Various modifications to the disclosed implementations will be readily apparent to those skilled in the art, and the general principles defined herein may be applied to other implementations and applications without departing from scope of the disclosure.

Thus, the present disclosure is not intended to be limited to the described and/or illustrated implementations, but is to be accorded the widest scope consistent with the principles and features disclosed herein.

In some instances, a database system can support a large number (e.g., tens or up to hundreds) of different data types that can include, for example, numeric types, date and time types, string (character and byte) types, and spatial types. The numeric types can further include exact numeric data types (e.g., INTEGER, SMALLINT, DECIMAL, and NUMERIC), and approximate numeric data types (e.g., FLOAT, REAL, and DOUBLE PRECISION). The string types can include, for example, CHAR, VARCHAR, BINARY, VARBINARY, BLOB, TEXT, ENUM, and SET. Additional or different data types can be supported and used. Tables stored in a database can include attributes represented by one or more of the data types. In some implementations, two or more tables to be JOINed can have attributes of different numeric types.

For example, a user (e.g., a programmer) can write a query including a JOIN statement to identify records for JOINing. An example query can resemble:

```
SELECT * FROM A, B
WHERE A · x = B · y
``` where A and B are two tables stored in one or more databases (e.g., a column-store or other database), x is an attribute of table A, and y is an attribute of table B. "A.x=B.y" is an example predicate or JOIN condition. If the evaluated predicate is true, a JOIN operation is then performed to produce a combined record in the expected format (e.g., the combined record can be a record set or a temporary table). In some cases, the attribute A.x is of a data type Tx (E.G., INTEGER), while attribute B.y is of another data type Ty (e.g., FLOAT). Assume A.x=Vx, where the value Vx is represented using the data type Tx, and B.y=Vy, where the value Vy is represented using the data type Ty.

Example described techniques can be used for performing JOIN value comparisons to determine whether a particular JOIN condition is satisfied (i.e., two attributes in two tables of different but compatible numeric types can be JOINed). For example, the example techniques can compare values Vx and Vy to determine whether the JOIN predicate, "A.x=B.y" is met for them. If Vx and Vy match, then the pair (Vx, Vy) becomes part of the evaluation result of the JOIN predicate "A.x=B.y", otherwise it doesn't.

Figure 1A:
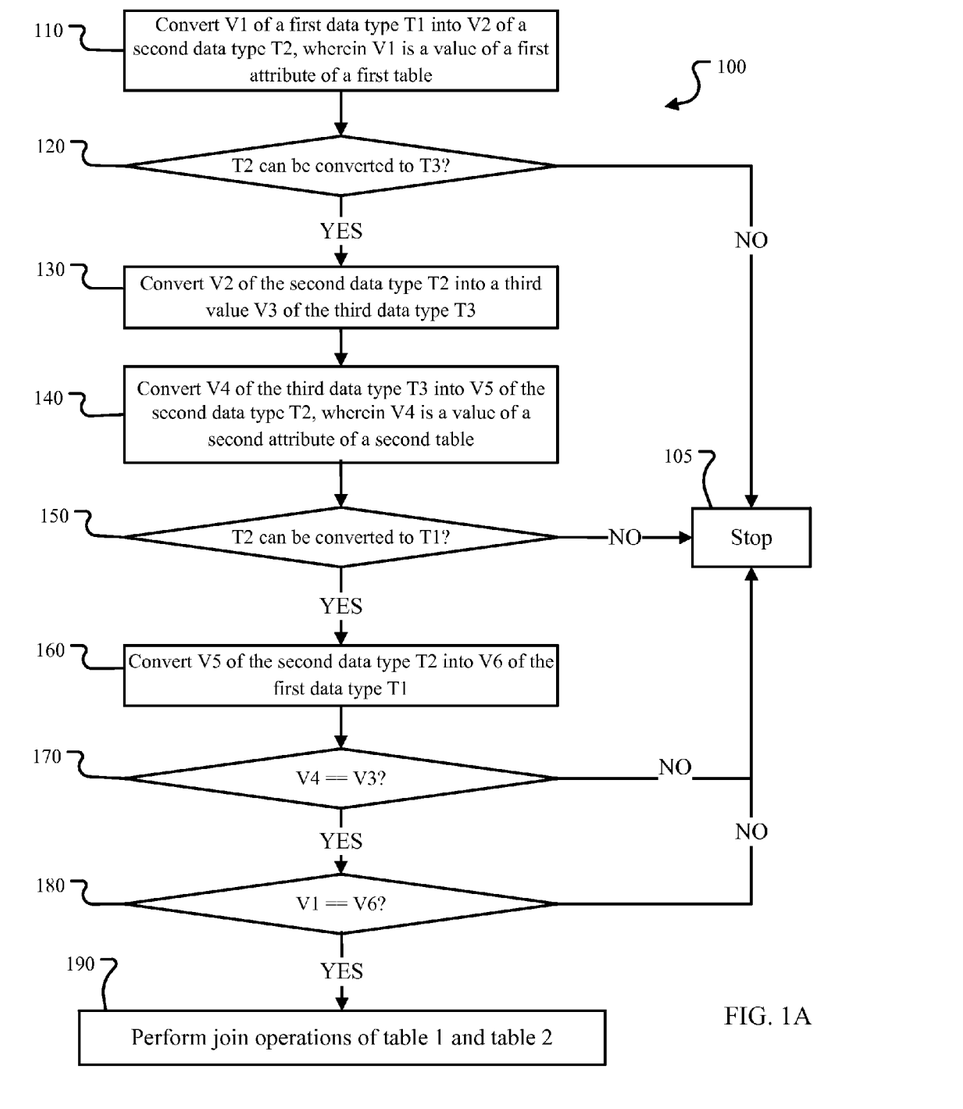
FIG. 1A is a flow chart illustrating a method for performing JOIN value comparisons according to an implementation.
Figure 1B:
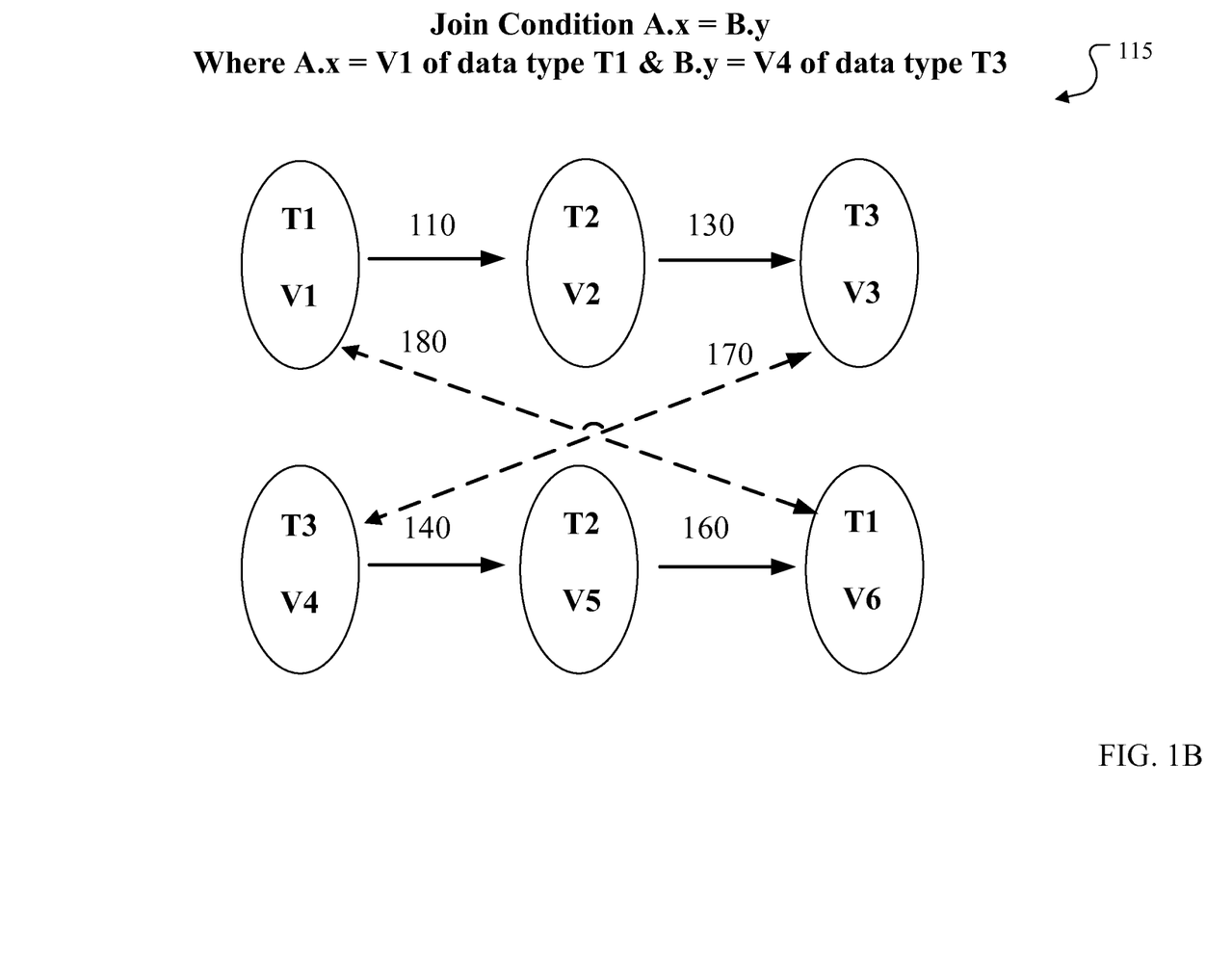
FIG. 1B is a block diagram illustrating aspects of the method for performing JOIN value comparisons according to an implementation.

FIG. 1A is a flow chart illustrating a method 100 for performing JOIN value comparisons according to an implementation. FIG. 1B is a block diagram 115 showing some steps of the example method 100. The method 100 can be performed, for example, by the example computer or computer system as described with respect to FIG. 2, or any other suitable system, environment, software, and hardware, or a combination of systems, environments, software, and hardware as appropriate. In some implementations, various steps of method 100 can be run in parallel, in combination, in loops, and/or in any order.

At a high level, the example method 100 can evaluate a JOIN condition like A.x=B.y on two columns, a first attribute A.x of a first table A and a second attribute B.y of a second table B. Every value in the first column A.x can be compared to every value in the second column B.y. In terms of the computational effort of a JOIN operation, if column A.x has N entries and B.y has M, then N*M comparisons of value pairs need to be evaluated. FIG. 1A and FIG. 1B describes an example evaluation of a JOIN condition A.x=B.y for a single pair of values, where the value of the attribute A.x is V1 of a first data type T1 while the value of the attribute B.y is V4 of a third data type T3.

At 110, the first value V1 of the first data type T1 is converted into a second value of a second data type T2. In some implementations, the first data type T1 can be a numeric type (e.g., a FLOAT type) while the second data type T2 can be a string type (e.g., a CHAR type). For instance, V1 can be a number 3.14; the number can be converted into V2, a string of characters, '3,' '.,' '1,' and '4.' From 110, method 100 proceeds to 110.

At 120, whether the second data type T2 is able to be converted to the third data type T3 is determined. T3 is the data type of the value V4 of the attribute y of the second table B. In some implementations, the third data type T3 can be a numeric type the same or different from the first data type T1. For example, T3 can be a DOUBLE PRECISION type while T1 can be an INTEGER, FLOAT, or another data type. If the conversion from T2 to T3 cannot be performed, for example, if the string type cannot represent a certain numeric type, method 100 proceeds from 120 to 105; otherwise, method 100 proceeds from 120 to 130.

At 130, in response to determining that the second data type T2 is able to be converted to the third data type T3, the second value V2 of the second data type T2 is converted into a third value V3 of the third data type T3. From 130, method 100 proceeds to 140.

At 140, the fourth value V4 of the third data type T3 is converted into a fifth value V5 of the second data type T2. The fourth value V4 is the value of the second attribute y of the second table B. As an example, the third data type T3 can be a numeric data type that is convertible to the second data type T2 that is a string type. As such, the value V4 can be represented as a string of characters, denoted as V5. From 140, method 100 proceeds to 150.

At 150, whether the second data type T2 is able to be converted to the first data type T1, can be determined. T1 is the data type of the value V1 of the first attribute x of the first table A. If the conversion from T2 to T1 cannot be performed, the method 100 proceeds from 150 to 105 where the method 100 stops; otherwise, method 100 proceeds from 150 to 160.

At 160, in response to determining that the second data type T2 is able to be converted to the first data type T1, the fifth value V5 of the second data type T2 is converted into a sixth value V6 of the first data type T1.

At 170, whether the fourth value V4 equals the third value V3 is determined. Here, both V3 and V4 are of the same data type, T3, the data type of the value V4 of the attribute y of the second table B. If the values of V3 and V4 are the same, the method 100 proceeds from 170 to 105 where the method stops; otherwise, method 100 proceeds from 170 to 180.

At 180, whether the sixth value V6 equals the first value V1 is determined. Both V1 and V6 are of the same data type, T1, the data type of the value V1 of the first attribute x of the first table A. If the values of V1 and V6 are the same, the method 100 proceeds from 180 to 105 where the method 100 stops; otherwise, method 100 proceeds from 180 to 190.

At 190, JOIN operations of the first table and the second table are performed in response to determining that the first value V1 equals the sixth value V6, and the fourth value V4 equals the third value V3. In this case, the predicate or JOIN condition is satisfied; the JOIN operations can be performed. After 190, method 100 stops.

At 105, it is considered that the JOIN condition (e.g., the predicate A.x=B.y) is not satisfied; the JOIN operations of the first table and the second table will not be performed. After 105, method 100 stops.

Figure 2:
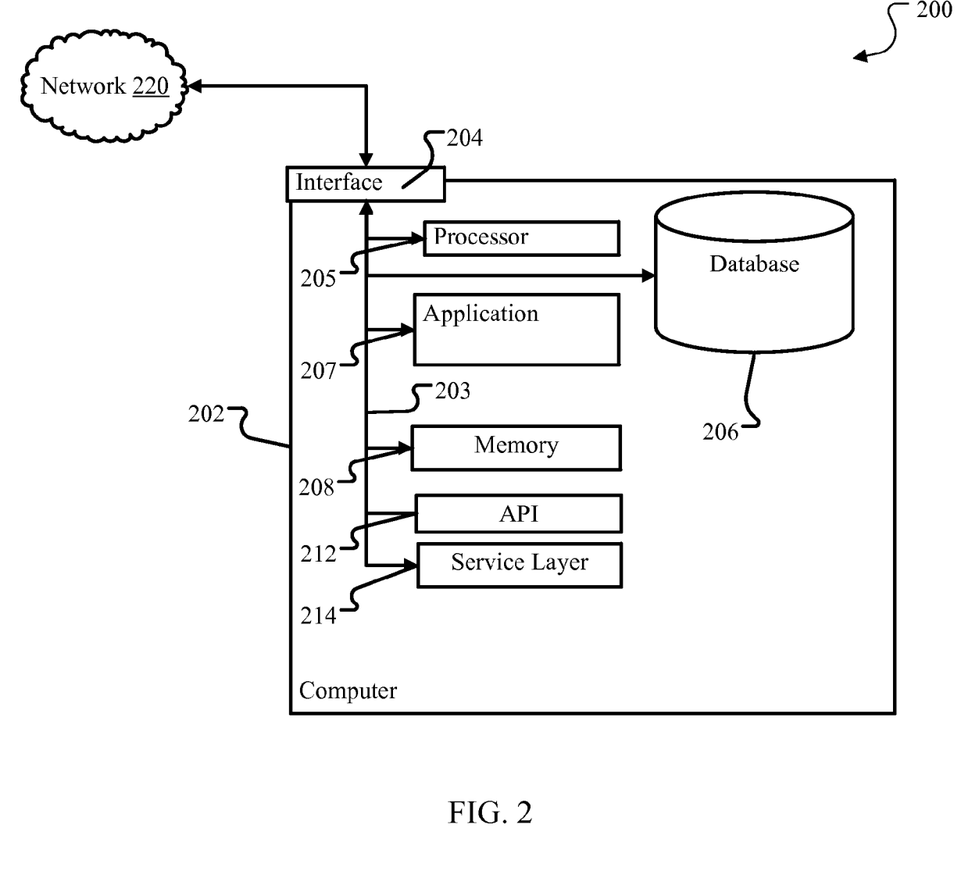
FIG. 2 is a block diagram of an exemplary computer that can be used for performing JOIN value comparisons according to an implementation.

FIG. 2 is a block diagram 200 of an exemplary computer 202 that can be used for performing JOIN value comparisons according to an implementation. The computer 202 can be a stand-alone computer system or a component of an example distributed computing system (EDCS) for performing JOIN value comparisons according to an implementation. The illustrated computer 202 can encompass any computing device such as a server, desktop computer, laptop/notebook computer, wireless data port, smart phone, personal data assistant (PDA), tablet computing device, one or more processors within these devices, or any other suitable processing device, including both physical and/or virtual instances of the computing device. Additionally, the computer 202 may comprise a computer that includes an input device, such as a keypad, keyboard, touch screen, or other device that can accept user information, and an output device that conveys information associated with the operation of the computer 202, including digital data, visual and/or audio information, or a GUI.

The computer 202 can process for/serve as a client, a server, a UI layer, an application, and/or any other component of the EDCS. The illustrated computer 202 is communicably coupled with a network 220. In some implementations, one or more components of the computer 202 may be configured to operate within a cloud-computing-based environment.

At a high level, the computer 202 is an electronic computing device operable to receive, transmit, process, store, or manage data and information associated with the EDCS. According to some implementations, the computer 202 may also include or be communicably coupled with a cloud-computing server, application server, e-mail server, web server, caching server, streaming data server, business intelligence (BI) server, and/or other server.

The computer 202 can receive requests over network 220 from a client application (e.g., a mobile UI, web-based application UI, and/or a desktop application executing on this or another computer 202 in use by a user/customer) and respond to the received requests by processing the said requests in an appropriate software application. For example, the computer 202 can receive a query from a user to perform a JOIN operation of two or more tables stored in the database 206. The JOIN operation can be conditioned on a predicate (e.g., the above-described example predicate "A.x=B.y"). In addition, requests may also be sent to the computer 202 from internal users (e.g., from a command console or by other appropriate access method), external or third parties, other automated applications, as well as any other appropriate entities, individuals, systems, or computers.

Each of the components of the computer 202 can communicate using a system bus 203. In some implementations, any and/or all the components of the computer 202, both hardware and/or software, may interface with each other and/or the interface 204 over the system bus 203 using an API 212 and/or a service layer 214. The API 212 may include specifications for routines, data structures, and object classes. The API 212 may be either computer language-independent or -dependent and refer to a complete interface, a single function, or even a set of APIs. The service layer 214 provides software services to the computer 202 and/or the EDCS. The functionality of the computer 202 may be accessible for all service consumers using this service layer. Software services, such as those provided by the service layer 214, provide reusable, defined business functionalities through a defined interface. For example, the interface may be software written in JAVA, C++, or other suitable language providing data in extensible markup language (XML) format or other suitable format. While illustrated as an integrated component of the computer 202, alternative implementations may illustrate the API 212 and/or the service layer 214 as stand-alone components in relation to other components of the computer 202 and/or EDCS. Moreover, any or all parts of the API 212 and/or the service layer 214 may be implemented as child or sub-modules of another software module, enterprise application, or hardware module without departing from the scope of this disclosure.

The computer 202 includes an interface 204. Although illustrated as a single interface 204 in FIG. 2, two or more interfaces 204 may be used according to particular needs, desires, or particular implementations of the computer 202 and/or EDCS. The interface 204 is used by the computer 202 for communicating with other systems in a distributed environment—including within the EDCS—connected to the network 220. Generally, the interface 204 comprises logic encoded in software and/or hardware in a suitable combination and operable to communicate with the network 220. More specifically, the interface 204 may comprise software supporting one or more communication protocols associated with communications such that the network 220 or interface's hardware is operable to communicate physical signals within and outside of the illustrated EDCS.

The computer 202 includes a processor 205. Although illustrated as a single processor 205 in FIG. 2, two or more processors may be used according to particular needs, desires, or particular implementations of the computer 202 and/or the EDCS. Generally, the processor 205 executes instructions and manipulates data to perform the operations of the computer 202. Specifically, the processor 205 executes the functionality required for performing JOIN value comparisons.

The computer 202 also includes a database 206 and memory 208 that hold data for the computer 202 and/or other components of the EDCS. Although illustrated as a single database 206 and memory 208 in FIG. 2, two or more databases 206 and memories 208 may be used according to particular needs, desires, or particular implementations of the computer 202 and/or the EDCS. While database 206 and memory 208 are illustrated as integral components of the computer 202, in alternative implementations, the database 206 and memory 208 can be external to the computer 202 and/or the EDCS. In some implementations, the database 206 can be a conventional database or an in-memory database, or a mix of both. In some implementations, the database 206 can be a column-store database or a row-store database, or a mix of both. In some implementations, database 206 and memory 208 can be combined into one component.

The application 207 is an algorithmic software engine providing functionality according to particular needs, desires, or particular implementations of the computer 202 and/or the EDCS, particularly with respect to functionalities required for performing JOIN value comparisons. Further, although illustrated as a single application 207, the application 207 may be implemented as multiple applications 207 on the computer 202. In addition, although illustrated as integral to the computer 202, in alternative implementations, the application 207 can be external to the computer 202 and/or the EDCS.

There may be any number of computers 202 associated with, or external to, the EDCS and communicating over network 220. Further, the term "client," "user," and other appropriate terminology may be used interchangeably as appropriate without departing from the scope of this disclosure. Moreover, this disclosure contemplates that many users may use one computer 202, or that one user may use multiple computers 202.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," and/or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, e.g., a central processing unit (CPU), an FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multitouch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language-independent or -dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method comprising:
converting, by operation of a computer system, a first value of a first data type into a second value of a second data type, wherein the first value is a value of a first attribute of a first table;
converting, by operation of a computer system, the second value of the second data type into a third value of a third data type;
converting, by operation of a computer system, a fourth value of the third data type into a fifth value of the second data type, wherein the fourth value is a value of a second attribute of a second table;

converting, by operation of a computer system, the fifth value of the second data type into a sixth value of the first data type; and performing JOIN operations of the first table and the second table in response to determining that the first value equals the sixth value, and the fourth value equals the third value.

2. The method of claim 1, further comprising:

determining, by operation of the computer system, whether the second data type is able to be converted to the third data type; and wherein converting the second value of the second data type into the third value of a third data type comprises converting the second value of the second data type into the third value of a third data type in response to determining that the second data type is able to be converted to the third data type.

3. The method of claim 1, further comprising:

determining, by operation of the computer system, whether the second data type is able to be converted to the third data type; and refraining from performing JOIN operations of the first table and the second table in response to determining that the second data type is not able to be converted to the third data type.

4. The method of claim 1, further comprising:

determining, by operation of the computer system, whether the second data type is able to be converted to the first data type; and wherein converting the fifth value of the second data type into the sixth value of the first data type comprises converting the fifth value of the second data type into the sixth value of the first data type in response to determining the second data type is able to be converted to the first data type.

5. The method of claim 1, further comprising:

determining, by operation of the computer system, whether the second data type is able to be converted to the first data type; and refraining from performing JOIN operations of the first table and the second table in response to determining that the second data type is not able to be converted to the first data type.

6. The method of claim 1, wherein the second data type comprises a string type.

7. The method of claim 1, wherein each of the first data type and the third data type comprises a numeric type.

8. A non-transitory, computer-readable medium storing computer-readable instructions executable by a computer and configured to:

convert a first value of a first data type into a second value of a second data type, wherein the first value is a value of a first attribute of a first table;

convert the second value of the second data type into a third value of a third data type;

convert a fourth value of the third data type into a fifth value of the second data type, wherein the fourth value is a value of a second attribute of a second table;

convert the fifth value of the second data type into a sixth value of the first data type; and perform JOIN operations of the first table and the second table in response to determining that the first value equals the sixth value, and the fourth value equals the third value.

9. The medium of claim 8, further comprising instructions operable to:

determine whether the second data type is able to be converted to the third data type; and wherein converting the second value of the second data type into the third value of a third data type comprises converting the second value of the second data type into the third value of a third data type in response to determining that the second data type is able to be converted to the third data type.

10. The medium of claim 8, further comprising instructions operable to:

determine whether the second data type is able to be converted to the third data type; and refrain from performing JOIN operations of the first table and the second table in response to determining that the second data type is not able to be converted to the third data type.

11. The medium of claim 8, further comprising instructions operable to:

determine whether the second data type is able to be converted to the first data type; and wherein converting the fifth value of the second data type into the sixth value of the first data type comprises converting the fifth value of the second data type into the sixth value of the first data type in response to determining the second data type is able to be converted to the first data type.

12. The medium of claim 8, further comprising instructions operable to:

determine whether the second data type is able to be converted to the first data type; and refrain from performing JOIN operations of the first table and the second table in response to determining that the second data type is not able to be converted to the first data type.

13. The medium of claim 8, wherein the second data type comprises a string type.

14. The medium of claim 8, wherein each of the first data type and the third data type comprises a numeric type.

15. A system, comprising:

a memory;

at least one hardware processor interoperably coupled with the memory and configured to:

convert a first value of a first data type into a second value of a second data type, wherein the first value is a value of a first attribute of a first table;

convert the second value of the second data type into a third value of a third data type;

convert a fourth value of the third data type into a fifth value of the second data type, wherein the fourth value is a value of a second attribute of a second table;

convert the fifth value of the second data type into a sixth value of the first data type; and perform JOIN operations of the first table and the second table in response to determining that the first value equals the sixth value, and the fourth value equals the third value.

16. The system of claim 15, further configured to:

determine whether the second data type is able to be converted to the third data type; and wherein converting the second value of the second data type into the third value of a third data type comprises converting the second value of the second data type into the third value of a third data type in response to determining that the second data type is able to be converted to the third data type.

17. The system of claim 15, further configured to:
  determine whether the second data type is able to be converted to the third data type; and
  refrain from performing JOIN operations of the first table and the second table in response to determining that the second data type is not able to be converted to the third data type.

18. The system of claim 15, further configured to:
  determine whether the second data type is able to be converted to the first data type; and
  wherein converting the fifth value of the second data type into the sixth value of the first data type comprises converting the fifth value of the second data type into the sixth value of the first data type in response to determining the second data type is able to be converted to the first data type.

19. The system of claim 15, further configured to:
  determine whether the second data type is able to be converted to the first data type; and
  refrain from performing JOIN operations of the first table and the second table in response to determining that the second data type is not able to be converted to the first data type.

20. The system of claim 15, wherein the second data type comprises a string type.

21. The system of claim 15, wherein each of the first data type and the third data type comprises a numeric type.

* * * * *